(12) United States Patent
Li et al.

(10) Patent No.: US 8,006,193 B2
(45) Date of Patent: Aug. 23, 2011

(54) WEB SERVICE USER EXPERIENCE WITHOUT UPFRONT STORAGE EXPENSE

(75) Inventors: Margaret Li, Bellevue, WA (US); Srikanth Shoroff, Sammamish, WA (US); Paramesh Siddesha, Bellevue, WA (US); Maxim A. Ivanov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 11/906,686

(22) Filed: Oct. 3, 2007

(65) Prior Publication Data

US 2009/0094543 A1 Apr. 9, 2009

(51) Int. Cl.
*G06F 13/00* (2006.01)
*G06F 15/00* (2006.01)

(52) U.S. Cl. .................................. 715/763; 715/765

(58) Field of Classification Search .......... 715/851–855, 715/762–765, 736–743
See application file for complete search history.

(56) References Cited

U.S. PATENT DOCUMENTS

| | | | |
|---|---|---|---|
| 6,839,815 B2 | 1/2005 | Kagami et al. | |
| 6,851,030 B2 | 2/2005 | Tremaine | |
| 2001/0033557 A1 | 10/2001 | Amalfitano | |
| 2003/0012143 A1 | 1/2003 | Chen et al. | |
| 2003/0233541 A1* | 12/2003 | Fowler et al. | 713/155 |
| 2004/0172474 A1 | 9/2004 | Markaryan et al. | |
| 2005/0102154 A1 | 5/2005 | Dodd et al. | |
| 2005/0234926 A1 | 10/2005 | Warner | |
| 2005/0262228 A1 | 11/2005 | Traappeniers et al. | |
| 2006/0085420 A1 | 4/2006 | Hwang et al. | |
| 2006/0123118 A1 | 6/2006 | Choe et al. | |
| 2007/0027983 A1 | 2/2007 | Bowra et al. | |
| 2007/0081554 A1 | 4/2007 | Saffre et al. | |
| 2007/0214259 A1* | 9/2007 | Ahmed et al. | 709/224 |

FOREIGN PATENT DOCUMENTS

| | | |
|---|---|---|
| JP | 2006191552 A | 7/2006 |
| KR | 20070090613 A | 9/2007 |
| WO | WO 2007046596 A1 | 4/2007 |

OTHER PUBLICATIONS

International Search Report dated Apr. 13, 2009 from corresponding International Application No. PCT/US2008/077043.
Yan Y. et al., "Preliminary Experience of ARMS: A Web Service Based Automatic Resource Management System," http://www.hpl.hp.com/techreports/2002/HPL-2002-295.ps.
Cockcroft, A. et al., "Service Level Definitions and Interactions," Sun BluePrints OnLine—Apr. 1999, http://www.sun.com/blueprints/0499/method1.pdf.
Schlegel, K., et al., "User Experience and the Bottom Line," META Group, White Paper, Mar. 2003, http://www.keynote.com/docs/datasheets/UserExpandtheBottomLine.pdf.

* cited by examiner

*Primary Examiner* — Cao "Kevin" Nguyen
(74) *Attorney, Agent, or Firm* — Wolf, Greenfield & Sacks, P.C.

(57) ABSTRACT

A method is provided for allocating resources for users of a service based on whether a user has expressed intent to fully utilize capabilities of the service. If the intent is expressed by a user, an infrastructure is created that enables the user to maintain, via a user interface, artifacts associated with an account of the user on the service. A user that has not yet expressed such intent is presented with a prospective user interface simulating the user interface without enabling the prospective user to maintain the artifacts associated with an account of the prospective user.

20 Claims, 6 Drawing Sheets

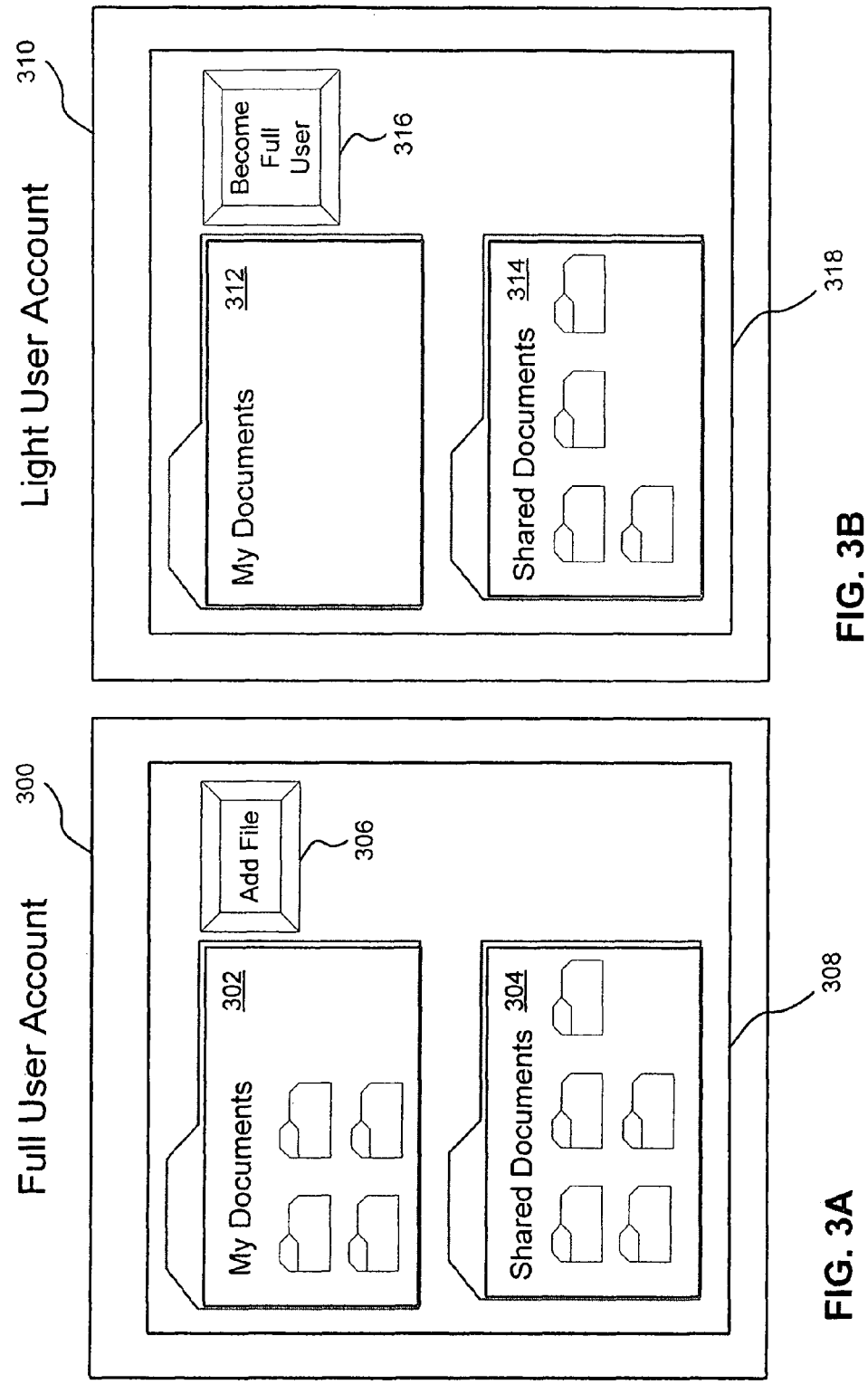

WEB SERVICE USER EXPERIENCE WITHOUT UPFRONT STORAGE EXPENSE

BACKGROUND OF THE INVENTION

Web services that allow users to maintain information and share it with other users are known. For example, websites created using Microsoft SharePoint allow users to work collaboratively by facilitating sharing of information. In such systems, website accounts may be created for users of the service. A user of the Internet service can utilize a website account to create, edit, and store within the system folders, documents, tasks or other artifact that are associated with the user. Moreover, an owner of an account can grant access to the account to other users, who then can view, depending on the nature of the access granted, edit or store and data on the account.

The web service provides a user interface through which users may create or otherwise access artifacts stored by the system. This interface defines the user experience to the service by controlling the types of functions that users may perform with the service. For example, the interface may allow a user to view word processing documents as formatted text or artifacts representing task entries displayed in a calendar format.

When an account for a user is first created, resources are allocated for the account, including infrastructure that will allow the user create and store data on the account. The resources of a system dedicated to such infrastructure for the service can be significant, particularly if a number of users of the service is large.

The inventors have appreciated that users of an Internet service may differ in their user behavior. Some users actively utilize capabilities of the service by, for example, creating documents to be stored within their account, communicating with other users of the service, and inviting new users. Other users may subscribe to the Internet service only to find out that they are not interested in continuing using the service. Some users may join the service but defer utilizing full capabilities provided by the service to a later time.

Prior art services have lacked an effective means to discriminate among users based on their intent regarding utilizing capabilities of the service. Therefore, in such services, an amount of upfront resources had to be allocated for each user account that did not reflect a user's intent regarding how actively the user wishes to utilize capabilities of the service. Thus, valuable system resources were consumed by accounts for users which never intended to utilize capabilities provided by the resources.

SUMMARY OF THE INVENTION

To reduce the cumulative amount of resources allocated to users of an Internet service, different amounts of resources may be allocated to users. An amount of resources could be allocated to a user selected based on whether the user's intent to fully utilize capabilities of the service was expressly stated, such as by opting to receive a "full" account rather than a "light" account that provides access to a reduced level of website functionality. The reduction or resources used may be accomplished by allocating a certain amount of resources for an account of a user who has expressed the intent to fully utilize the capabilities of the service. A user who has not yet expressed such intent may be allowed to participate in the service, including interacting with other users of the service, without setting aside the same amount of resources for an account of this user. User experience provided to both types of users may be similar so that users who are not fully utilizing capabilities of the service experience the same look and feel of the service.

A prospective user may be invited by a user of the service to access the service and may be presented with a prospective user interface, which may enable the prospective user to perform functions related to artifacts associated with accounts of other users. However, such a prospective user may be initially provided with a "light" account that does not allow the user to perform functions related to artifacts associated with the user's own account. The prospective user interface may otherwise simulate a user interface of a user that fully utilizes capabilities of the service.

Conversely, a prospective user may express the intent to fully utilize the capabilities of the service when joining the service. A user that has not yet expressed the intent but is already participating in the service may express the intent as well, such as by accessing a function through the user interface that allows a "light" user to enroll as a "full" user. Upon expressing the intent, an infrastructure on the service may be created for the prospective user, wherein the account infrastructure enables the prospective user to access a fuller range of functions, including maintaining artifacts associated with an account on the service. The prospective user interface may be modified to enable the prospective user to perform both functions related to artifacts associated with accounts of other users and functions related to artifacts associated with the user's own account.

In one aspect, the invention relates to a method of allocating resources for users of a service. The service may provide an interface for a user having an account on the service through which the user can perform first functions related to artifacts associated with the user's own account and second functions related to artifacts associated with accounts of other users. Such a method may comprise communicating an invitation from a user of the service to a prospective user to access the service. A prospective user interface may be presented for the prospective user to simulate the user interface experienced by a "full" user without enabling the prospective user to perform the first functions. Via the prospective user interface, an opportunity to utilize capabilities of the service comprising the first functions and the second functions may be offered to the prospective user. In response to the prospective user accepting the offer, an account infrastructure may be created on the service for the prospective user, wherein the account infrastructure enables the prospective user to maintain artifacts associated with an account on the service. A modified user interface for the prospective user may be presented, the modified user interface enabling the prospective user to perform the first functions and the second functions.

In another aspect, the invention relates to server software. The server software may comprise computer-executable instructions for implementing a service for each of a plurality of users. Such a service may support a first type of user interaction and a second type of user interaction, different than the first type of user interaction, the second type of user interaction relating to manipulation of resources associated with an account of the user. The computer-executable instructions, when executed, may render a first user interface for a second user of the plurality of users invited by a first user of the plurality of users to access an account maintained by the service associated with the first user, the first user interface supporting the first type of user interaction. A capability to perform the second type of interaction may be offered to the second user, via the first user interface. In response to the second user accepting the offer, a second user interface for the second user may be rendered, the second user interface supporting the first type of user interaction and the second type of user interaction.

In further aspect, the invention relates to a method of allocating resources for users of a service. The service may provide an interface for a user having an account on the service through which the user can perform first functions related to artifacts associated with the user's own account and second functions related to artifacts associated with accounts of other users. Such a method may comprise inviting a prospective user to join the service and creating a first user interface for the prospective user to provide a user input, the first user interface providing a first degree of capabilities of the service. Via the first user interface, the prospective user may be offered an ability to utilize capabilities of the service above the first degree. In response to the prospective user accepting the offer, an infrastructure for an account for the prospective user may be created, wherein the account infrastructure utilizes resources of the service. A second user interface may be created, the second user interface providing a degree of capabilities of the service above the first degree.

The foregoing is a non-limiting summary of the invention, which is defined by the attached claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A is a diagram schematically illustrating a "full" user account according to an embodiment of the present invention;

FIG. 3B is a diagram schematically illustrating a "light" user account according to an embodiment of the present invention;

DETAILED DESCRIPTION OF THE INVENTION

Figure 1:
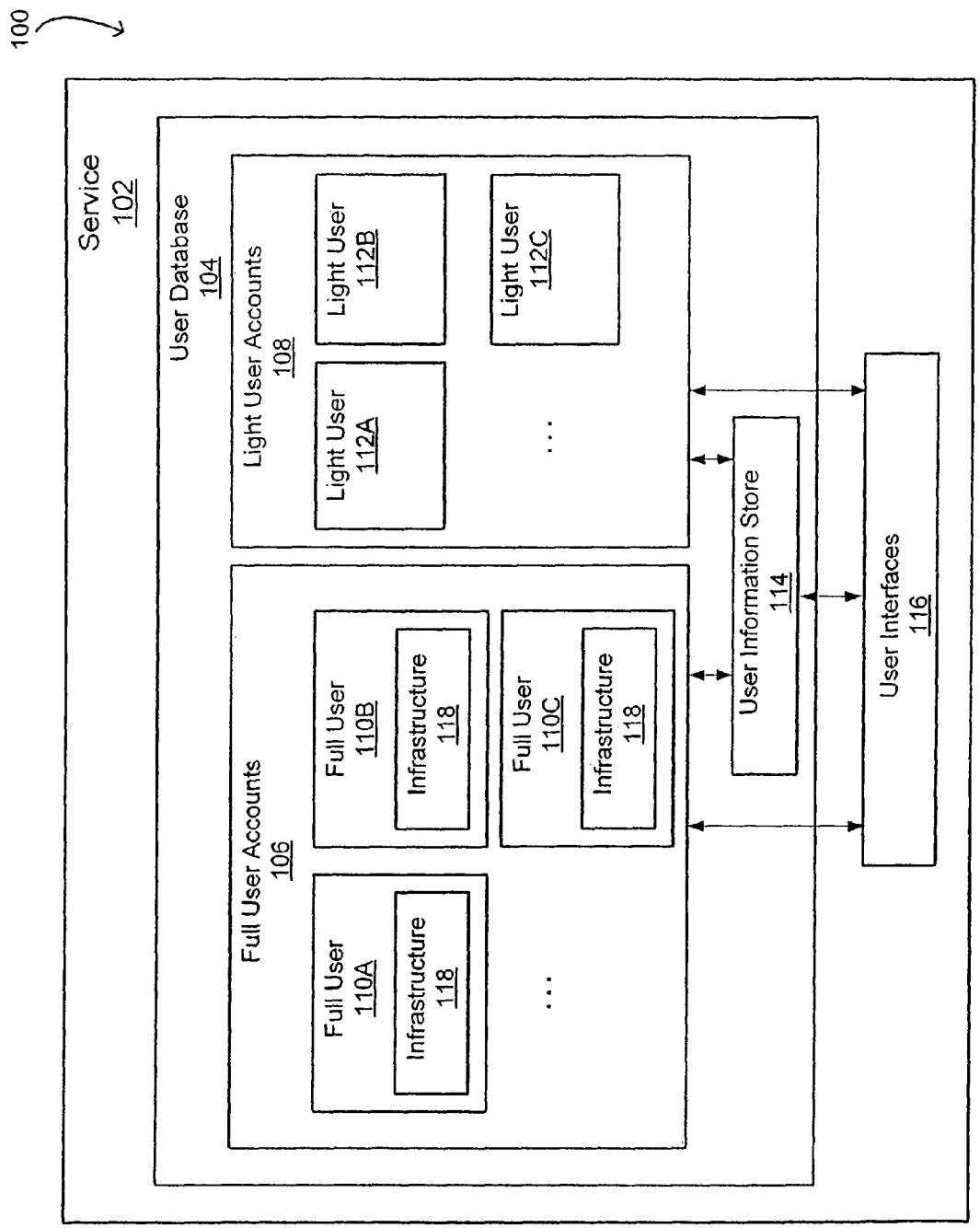
FIG. 1 is a block diagram schematically illustrating components of an Internet service according to embodiments of the present invention.

For a large number of users of the Internet service, this initial allocation of resources may incur significant storage costs. The inventors have appreciated that storage costs of an Internet service may be reduced by allocating different amount of resources to users of the service depending on an extent to which the users wish to participate in the service. Therefore, two or more different types of users may be provided with different capabilities of utilizing the service. In the examples provided herein, two types of users, termed "full" and "light" users are described.

The inventors have further appreciated that a prospective user who has been invited to access the service by another user of the service may be presented with a prospective user interface simulating a user interface provided to a "full" user to perform functions related to artifacts. The "full" user may be able to use that interface to perform functions associated with that user's own "full" account and functions related to artifacts associated with accounts of other users. The prospective user who joins the service only as a "light" user may be initially enabled to utilize capabilities of the service only related to artifacts. Such a user may be unable to access functions related to creating artifacts or other functions that would necessitate creating an infrastructure on the service for that user. However, prospective user may be able to access documents, document folders and other artifacts created and shared by other users in the same way as a "full" user.

The prospective user may be offered, via the prospective user interface, an opportunity to utilize capabilities of the service enabling the prospective user to perform functions related to artifacts associated with an account of the prospective user or otherwise have access to a higher degree of services. If the prospective user accepts the offer or otherwise indicates an interest to be a "full" user, an account infrastructure can be created for the prospective user which allows this user to maintain artifacts with the account of the prospective user on the service or to otherwise access a higher degree of services. Thereafter, the user interface presented to that user may be modified so that it becomes the user interface that enables the prospective user to maintain artifacts, which includes creating, storing, and modifying documents, document folders and other artifacts, as well as accessing documents, document folders and other artifacts created by other users of the service.

A prospective user that does not accept the offer may continue to utilize capabilities of the service related to artifacts associated with accounts of other users. Such a "light" user may thereafter be offered an opportunity to utilize capabilities of the service related to artifacts associated with an account of this user at any time during using the service. The offer may be enabled by a user interface used by the "light" user, which may be the same as the prospective user interface described above. Upon accepting the offer, an account infrastructure is created for the "light" user converting the "light" user to a "full" user. The user may then maintain artifacts associated with an account of this user on the service. The user interface presented to such a user may be modified to enable the user to perform functions related to artifacts associated with the user's own account. Both "light" and "full" users may be enabled to perform functions beyond those related to artifacts associated with a user's own account and functions related to artifacts associated with accounts of other users.

FIG. 1 illustrates an example of a system 100 in which embodiments of the present invention may be implemented. The system 100 comprises a service 102 which includes a user database 104. In one embodiment of the invention the service may be, for example, built using a Microsoft® Office® SharePoint Server to provide a mechanism to establish user accounts, create an infrastructure for an account so that artifacts may be maintained in conjunction with an account and to provide an interface through which a user may access functions performed by the service. However, the invention is not limited in this respect and any other suitable server may be substituted.

As discussed above, users of the service 102 may be categorized as "full" and "light" users. For the purpose of explaining embodiments of the invention, a prospective user may be considered "light" user in a sense that the prospective user may not be enabled to perform some of the functions performed by a "full" user. User database 104 comprises "full" user accounts 106 and "light" user accounts 108, which have different amounts of underlying resources allocated to the accounts, as described in more detail below.

In embodiments of the invention, an account for a "full" user includes an infrastructure that enables the "full" user to maintain artifacts associated with this account. In contrast, a "light" user does not include such infrastructure. As shown schematically in FIG. 1, each "full" user account (e.g., 110A-110C) includes an infrastructure 118 that allows the "full" user maintain artifacts associated with the "full" user's account. On the other hand, "light" users (e.g., 112A-112C) do not comprise such infrastructure. It should be appreciated that "full" and "light" user accounts are shown in FIG. 1 by way of example only and are by no means limited to components shown in FIG. 1.

In this context, infrastructure refers to resources on the server, frequency memory, to enable a user to create artifacts or otherwise perform functions associated with the user's account. The actual storage space for the artifacts may be allocated dynamically and therefore need not be considered part of the infrastructure.

In an embodiment of the invention where service 102 is built on the Microsoft® Office® SharePoint Server, a "MySite" website may be created on the server for a user. The website enables the user to view and access resources that have been made available for this user and displays, for example, tabs to show places where information is stored or may be stored and controls to other functions that may be performed by the user. When a prospective user is invited to access the service, the prospective user may still be provided with a prospective user interface that simulates such a user interface, providing at least a subset of the tabs and controls that appear on the user interface when the website created for a "full" user is displayed. Rather, for the prospective user, that interface may be created with a user interface shell, showing the tabs or other controls of a "MySite" website without actually creating that website, thus saving system resources used to create a website. As a result, a system comprising the service may be able to serve more users or be implemented less expensively to provide better performance or otherwise take advantage of reduced resource demand.

Information about users of a service may be stored in a separate store shown by way of example in FIG. 1 as a user information store 114. Different user information may be stored for "full" and "light" users. For example, information such as a name of the user, an e-mail address, a name of the account, or other identifying information may be stored for a "light" user. Information associated with a "full" user may be more detailed and may include, for example, occupation, geographical area, area(s) of expertise, preferences, interests and other information. However, it should be appreciated that any suitable type of user information may be stored describing both "light" and "full" users.

In embodiments of the invention, users of the service are provided with a user interface enabling the users to access their accounts and manage documents, content, links, and contacts associated with the accounts. As described above, "light" and "full" users may be provided with similarly looking, albeit different types of user interfaces, wherein a user interface for a "full" user enables the "full" user to perform functions related to artifacts associated with the "full" user's own account and functions related to artifacts associated with accounts of other users. A user interface for a "light" user enables the "light" user to perform functions related to arti-facts associated with accounts of other users. The artifacts may be documents, documents folders, contacts and any other suitable data that can be stored and managed in an account of a "full" user. A "light" user may be allowed to access (e.g., view) the artifacts maintained by a "full" user and edit the artifacts. In some embodiments, both or either viewing and editing may be performed in a secure manner, i.e., an owner of the artifacts expressly grants permission to other users to view and edits the artifacts. In some embodiments, the owner grants such permission to other users by inviting them (e.g., via an e-mail) to access the owner's account. However, the specific access control mechanism, if any, is not a limitation on the invention.

The service 102 in FIG. 1 is schematically shown as comprising user interfaces 116 that include both types of interfaces described above. The two types of user interfaces are shown as one component to illustrate that the user interfaces may provide similar experience to both "full" and "light" users. As was discussed above, in some embodiments of the invention, the "light" user interface is a simulation of the "full" user interface.

It should be appreciated that the service described above and any of components of the service can be implemented in any of numerous ways. For example, the service may be implemented in software (e.g., server software), hardware or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Both "light" and "full" users may be enabled to perform functions that are beyond functions related to artifacts associated with the users' own accounts and functions related to artifacts associated with accounts of other users. For example, the users may communicate via instant messaging, enter comments and other information to other user's websites, as well as perform any other suitable function. In some embodiments, such as, for example, an embodiment where service 102 is the Microsoft® Office® SharePoint Server, users may join a shared/viewing collaboration experience. However, any suitable functions may be performed by service 102. Those functions may be accessible through either or both of the "full" user and "light" user interfaces.

In some embodiments, the functions that require creation of an infrastructure on the service will be available through the "full" user interface functions that can be performed by a user without having a website already created for that user may appear on the "light" user interface or on both "light" and "full" user interfaces.

Figure 2:
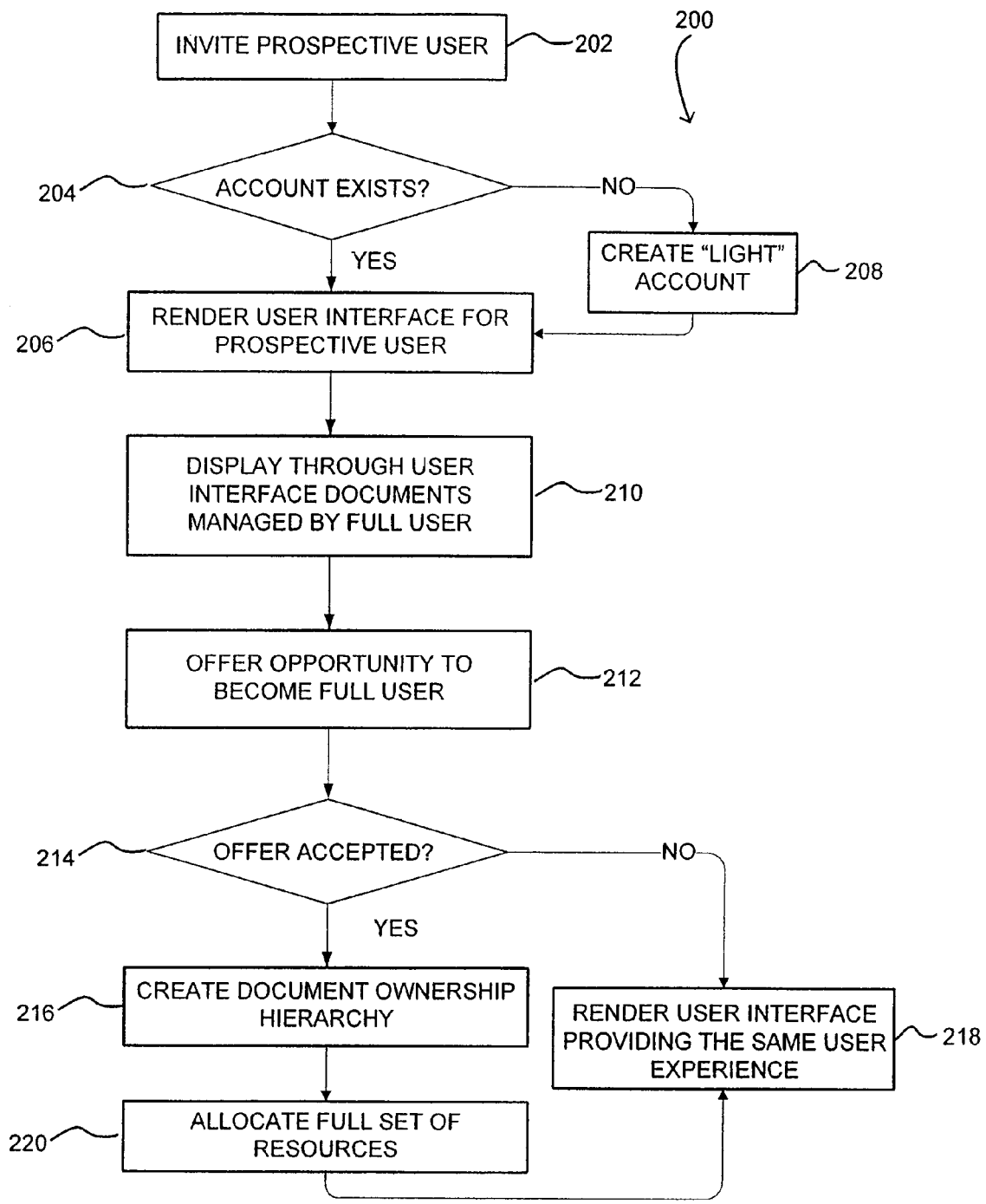
FIG. 2 is a flowchart illustrating a method of allocating resources for a user account according to embodiments of the present invention.

In embodiments of the invention, a method of allocating resources for users of a service is provided. FIG. 2 is a flow chart illustrating a method 200 of allocating resources for users of a service (e.g., service 102). The process starts at block 202, when an invitation is communicated from a user of the service to a prospective user to access the service. The access may be performed upon signing-up for the service. Alternatively, if the invitation is communicated to an existing user, the access may be performed by signing-in. The invitation may be communicated, for example, via an electronic mail or in any other suitable way.

In the embodiment illustrated, for the prospective user to access the service, the user needs to be registered with the service, i.e., the user needs to have some form of an account with the service so that the user can be authenticated by other users of the service.

However, having an account does not necessarily imply that a personal website or infrastructure to store documents has been created for the user. Therefore, as shown in FIG. 2, the process may then go to a decision block 204 where it is determined whether an account exists for the prospective user. In some embodiments of the invention, the account status may be determined when the prospective user receives the invitation to access the service. In some embodiments, having an account may comprise having a placeholder on the service for a prospective user. It should be appreciated that the invitation may be communicated to a "full" user as well, which is not discussed herein for clarity purposes, but could be the same as in a prior art web service.

If an account for the prospective user does not exist, it may be created, as shown in block 208. The created account, for the purpose of the description, is referred to as a "light" account to indicate that a user of the account is not provided with the same capabilities as a "full" user described above. In some embodiments of the invention, the "light" user may be created automatically using information (e.g., a name, e-mail address and other available personal information) from the invitation received by the prospective user. It should be appreciated that embodiments of the invention are not limited in this respect and an account for the prospective user may be created in any suitable way. When an account is created for a user, the information on the user may be stored on the service, for example, in user information store 114.

In one embodiment of the invention, the invitation as described above may be provided when a prospective user independently wishes to use the service, i.e., when the prospective user is not invited by a user of the service but accesses the service through a website or in any other suitable way. In this situation, the prospective user may not have an account and may be provided with, for example, a user interface to receive user input required to join (e.g., sign-up for) the service.

It should be appreciated that even though the term "prospective user" is used throughput the discussion below, for the purpose of describing embodiments of the invention, the prospective user may be considered a "light" user. Therefore, any user registered with the service who has not yet become a "full" user may be provided with an account and a user interface which render this user a "light" user, according to embodiments of the invention.

If the account for the prospective user on the service exists, the process may continue to block 206, where a user interface for the prospective user is rendered. The prospective user interface simulates a user interface rendered to "full" users without enabling the prospective user to perform the functions related to artifacts associated with users' own accounts.

In some embodiments of the invention, the prospective user interface is rendered using a user interface shell. The feel and look of the prospective user interface shell may be very similar to those of the "full" user interface. Therefore, the prospective user can be provided with a user experience that resembles a user experience of a "full" user, without a system having expended resources for an account of the "light" user.

Functions that are enabled by the prospective user interface may be related to artifacts associated with accounts of other users of the service. Therefore, the prospective user may access for viewing and editing documents, document folders and other artifacts created and stored by other users. These artifacts may be, for example, artifacts created, stored and maintained within accounts of "full" users. In some embodiments, "light" users may have artifacts associated with their accounts that do not require creation of an account infrastructure as for a "full" user. In those embodiments, artifacts associated with accounts of "light" users may likewise be accessed through the "light" user interface. FIG. 1 shows that, in block 210, documents managed by a "full" user may be displayed through the prospective user interface, which enables the prospective user to access the documents. Access to the documents managed by the "full" user may be restricted and the prospective user may need to obtain permission from the "full" user to access, edit or manipulate in other ways the documents. In some embodiments of the invention, the access is granted by an invitation sent by the "full" user to the prospective user. In other embodiments, an explicit permission may be provided in any suitable form, for example, by a password, or by adding, by the "full" user, the prospective user to a list of users that can perform certain functions on the documents managed by the "full" user. It should be appreciated that other suitable functions may be preformed by the prospective user within the account of the "full" user. In addition, the prospective use may need to provide some form of authentication to the owner's of the documents.

As discussed above, the prospective user may be offered, via the prospective user interface, an opportunity to utilize capabilities of the service exceeding the capabilities currently utilized by the prospective user (i.e., an opportunity to become a "full" user). Thus, the prospective user may be offered the ability to utilize capabilities of the service that comprise performing both functions related to artifacts associated with the user's own account or other functions not available to "light" users. FIG. 2 shows in block 212 that an opportunity to become a "full" user may be offered to the prospective user, which may be done via the prospective user interface.

If the prospective user accepts the offer to become a "full" user, which is determined in decision block 214, the process may branch to block 216, wherein document ownership hierarchy is created for the prospective user. The process may then continue to block 220 where a full set of resources is allocated for the account of the prospective user, which means that an infrastructure is created for the prospective user that enables the prospective user to maintain artifacts associated with the account on the service. The user interface presented to the user may also be changed from an interface for a prospective user to a modified user interface enabling the user to perform functions related to artifacts associated with the user's own account or otherwise perform functions of a "full" user. Therefore, the prospective user may be enabled to perform, among other suitable functions, functions related to creating and storing this user's own documents on the service.

As shown in block 218 of FIG. 1, upon creating the infrastructure for the prospective user who becomes the "full" user, a "full" user interface may be rendered. In contrast, a prospective user that has not accepted the offer, which is determined in decision block 214, may be provided with a similar user interface, as shown in FIG. 1. It should be appreciated that the user interfaces provided to a prospective and "full" user need not be identical and may differ in various ways, but provide the same user experience.

It should be appreciated that the prospective user that has not accepted the offer of block 212 and was subsequently rendered a "light," or prospective, user interface, thus becoming or remaining the "light" user, may be offered to become a "full" user at any suitable point in time, via the "light" user interface, as described in more detail below.

Differences between "full" and "light" user accounts described above are schematically shown in FIGS. 3A and 3B. A "full" user account 300 shown in FIG. 3A may comprise an infrastructure that allows a "full user" to have a "full" user interface 308 wherein documents created, maintained, stored and shared by a "full" user may be displayed, as shown in a "My Documents" component 302. The "full" user may access and, upon obtaining a required permission, edit documents created and stored by other users, which is schematically shown as a "Shared Documents" component 304. Therefore, documents included in "My Documents" component 302 of a "full" user may be contained in "Shared Documents" component 304 of another user. It should be appreciated that components 302 and 304 are shown by way of example only and the user interface of a "full" user may include any suitable components, including but not limited to icons, tabs, buttons, links and other components through which one or more functions may be performed.

The "full" user interface may contain components that allow access to functions that are only available to a "full" user. To illustrate that the "full" user may create documents, an "Add File" button is shown as part of the "full" user interface 306. However, it should be appreciated that documents may be created by the "full" user by any suitable way and using any suitable components. Likewise, other types of components allowing access to functions available to a "full" user may alternatively or additionally be included.

A "light" user account 310 shown in FIG. 3B may allow rendering a "light" user interface 318 wherein a "My Documents" component 312 is schematically shown as empty to indicate that the "light" user may not perform the function of creating and storing documents within the "light" user's account. However, the "light" user may access and, upon obtaining a required permission, edit documents created and stored by other users, which is shown as a "Shared Documents" component 314.

The "light" user may be offered to become a "full" user at any time. As described above in connection with FIG. 2, a prospective user may be offered to become a "full" user when the prospective user is invited by a user of the service to access the service and an account of the user. In some embodiments, a "full" user may invite the prospective user, but the invention is not limited in this respect and any user may be enabled to invite other user to join the service. Alternatively, the prospective user may decide to join the service irrespective of being invited by a user of the service. Further, a prospective user that has not expressed an intent to become a "full" user upon being invited to access the service and thus has become a "light" user, may choose to become a "full" user. Such a "light" user may be offered the ability to become a "full" user while utilizing capabilities of the service. FIG. 1 shows a "Become Full User" component 316 which may enable the "light" user to become a "full" user.

Figure 4A:
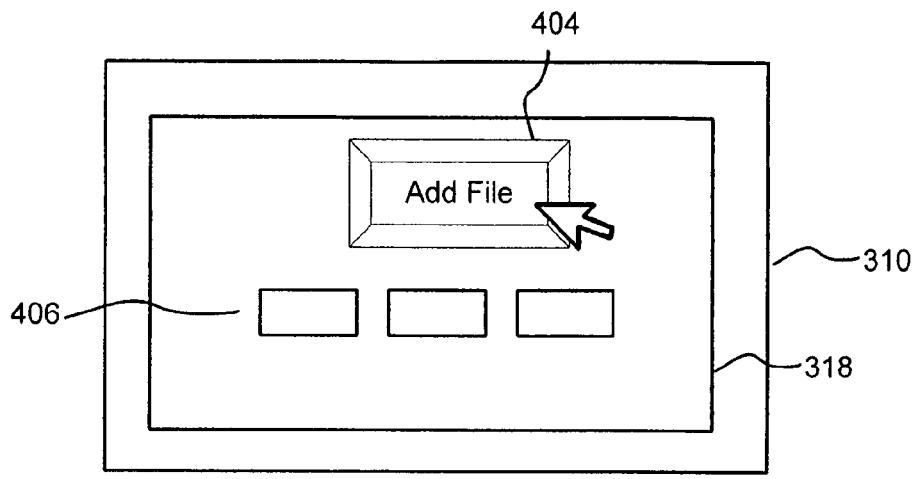
FIGS. 4A-4C are diagrams schematically illustrating components allowing a "light" user to express intent to become a "full" user according to an embodiment of the present invention.
Figure 4B:
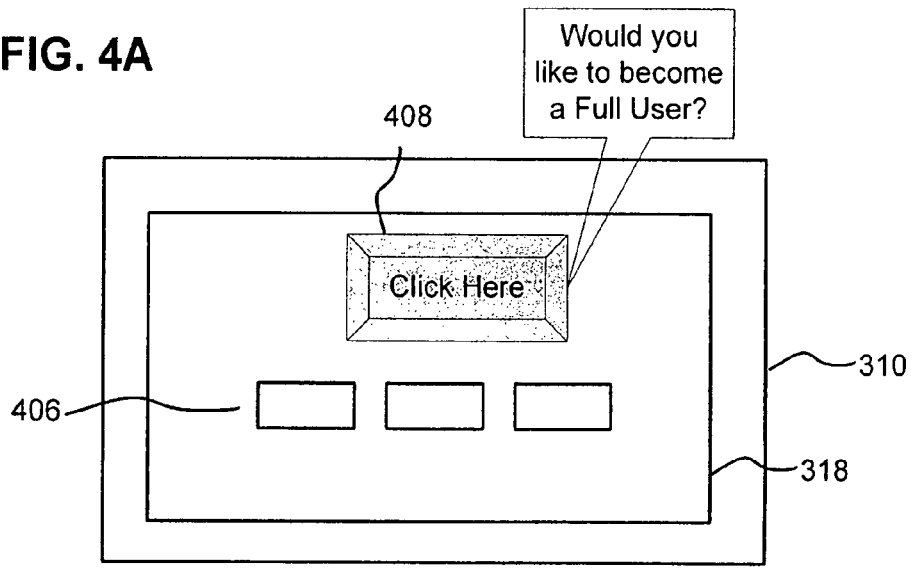

As discussed above, a user interface provided to prospective and "light" users may comprise features for the prospective and "light" users, which are collectively referred to herein as "light" users, to express intent to become "full" users. "Become Full User" component 316 shown in FIG. 3 may be displayed at any suitable time. For example, such a button may be presented when a "light" user attempts to perform a function only available to a "full" user. FIGS. 4A-4B schematically illustrate a process in which a "light" user may become a "full" user. FIG. 4A indicates "light" user account 310, which comprises a "light" user interface 318. The user interface 318 may include different components 406 (e.g., component 312 and 314 shown in FIG. 3). Components 406 are similar to components provided by a user interface for a "full" user.

Figure 4C:
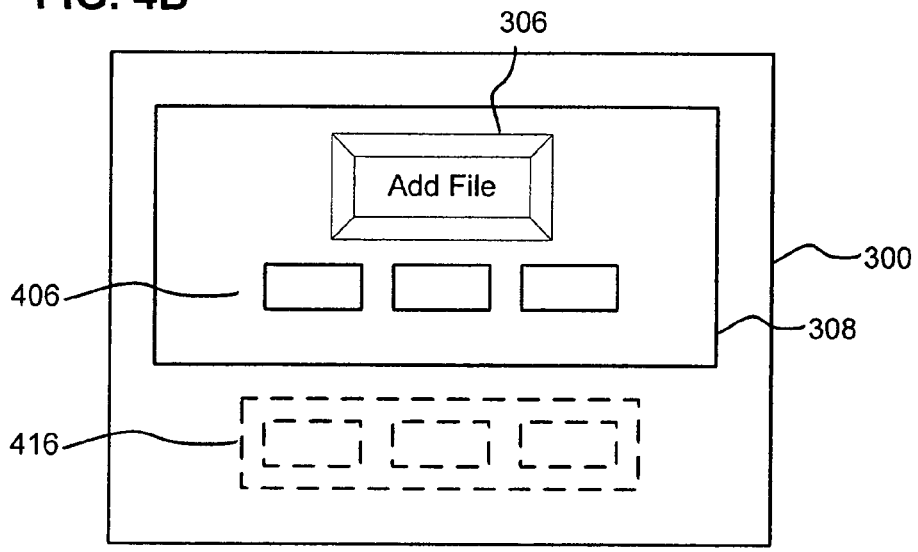

A component that allows the "light" user to express intent to become "full" user is shown by way of example as an "Add File" button 404. In this embodiment, adding a file is not a function supported for a "light" user. When the "light" user clicks the button 404, a message may be provided asking whether the user would like to become a "full" user, which is shown by way of example only in FIG. 4B as a "Click Here" component 408. If the "light" user wishes to become the "full" user and clicks component 408, an infrastructure 416 may then be created for the account which becomes "full" user account 300 and the "light" user becomes the "full" user, as shown in FIG. 4C. Infrastructure 416 may enable the prospective user to maintain artifacts associated with the account 300. The user interface becomes user interface 308 which provides a user experience similar to "light" user interface 318, but allowing the "full" user to utilize capabilities of the service to a fuller degree.

When a "light" user becomes a "full" user, the "light" user may be offered to enter additional user information which may then be stored in a user database on a service (e.g., in user information store 114). The additional information may comprise, for example, user's age, occupation, hobbies, interests, preferences, etc. This information may be used to provide a richer user experience to the now "full" user.

Figure 5:
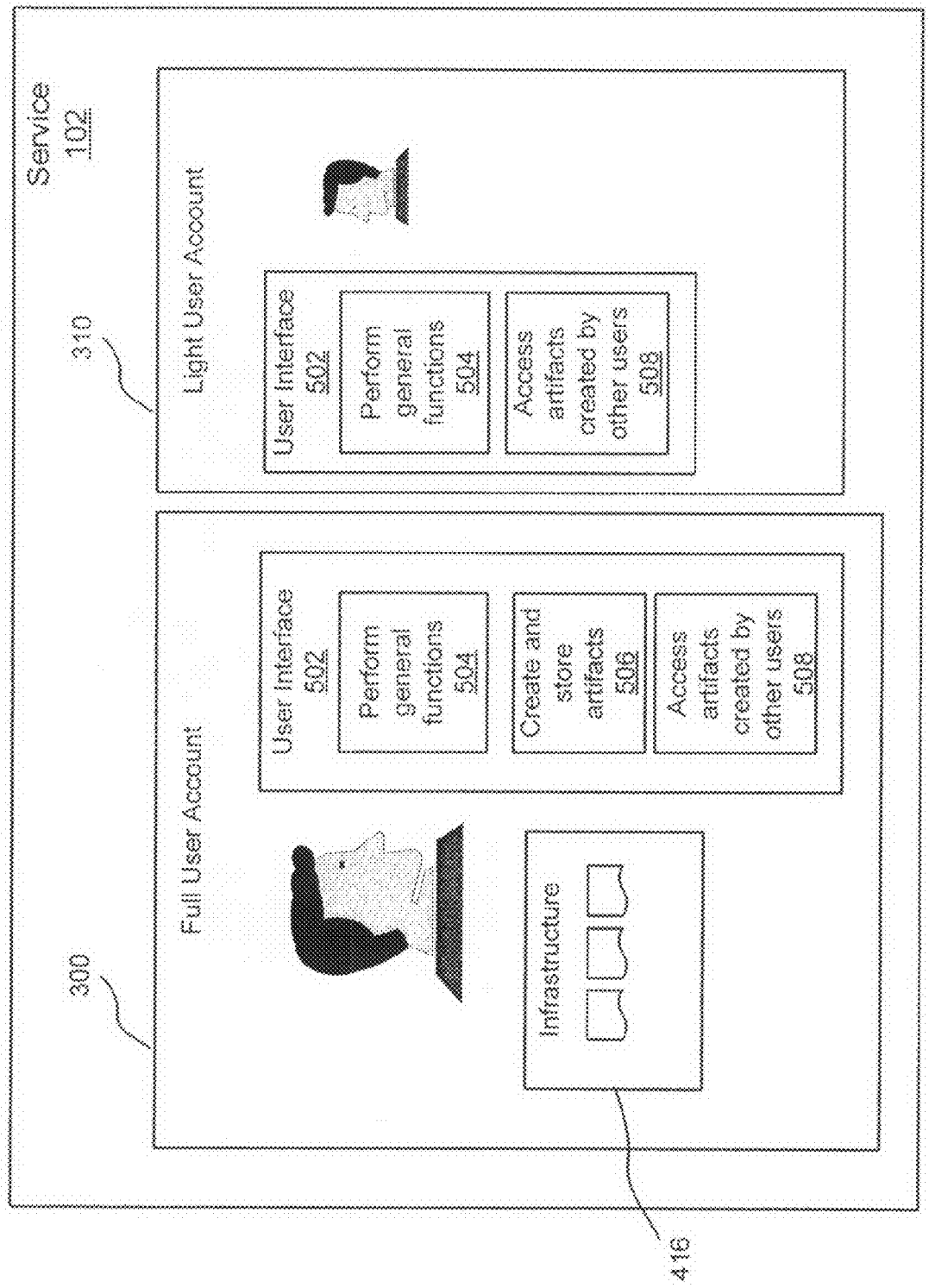
FIG. 5 is a diagram schematically illustrating user interfaces for the "full" and "light" users according to an embodiment of the present invention.

FIG. 5 is another illustration of a "full" and "light" user accounts and shows service 102 comprising components described above. FIG. 5 shows that similar user interface 502 is provided to both "full" and "light" users. While both "full" and "light" users may be enabled, via user interface 502, to perform general functions 504 and access artifacts created by other users 508, only "full" user may be enabled to create and store artifacts 506. General functions may be related to, for example, instant messaging, or other suitable functions.

The methods and systems described herein can be implemented on any suitable computer system, including a single device or distributed across a plurality of devices coupled in any suitable way.

Figure 6:
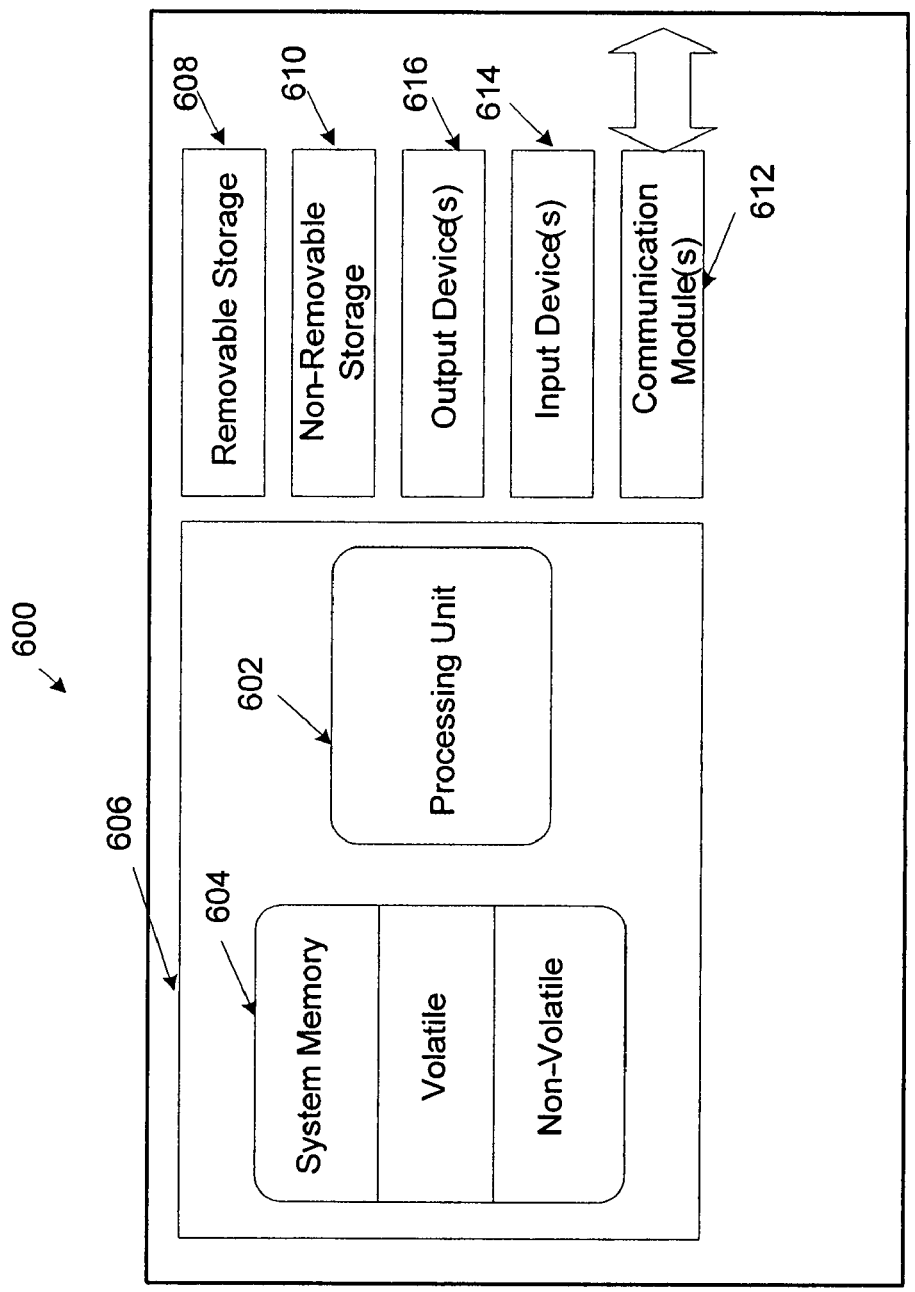
FIG. 6 is a diagram schematically illustrating a computing device in which embodiments of the invention can be implemented.

FIG. 6 illustrates an exemplary computer system for implementing some embodiments. FIG. 6 illustrates computing device 600, which includes at least one processor 602 and memory 604. Depending on the configuration and type of computing device, memory 604 may be volatile (such as RAM), non-volatile (such as ROM, flash memory, etc.) or some combination of the two.

Device 600 may include at least some form of computer readable media. By way of example, and not limitation, computer readable media may comprise computer storage media. For example, device 600 may also include storage (removable and/or non-removable) including, but not limited to, magnetic or optical disks or tape. Such additional storage is illustrated in FIG. 6 by removable storage 608 and non-removable storage 610. Computer storage media may include volatile and nonvolatile media, removable, and non-removable media of any type for storing information such as computer readable instructions, data structures, program modules or other data. Memory 604, removable storage 608 and non-removable storage 610 all are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600. Device 600 may also contain network communications module(s) 612 that allow the device to communicate with other devices via one or more communication media. By way of example, and not limitation, communication media may include wired media such as a wired network or direct-wired connection, and wireless media such as acoustic, RF, infrared and other wireless media. Network communication module(s) 612 may be a component that is capable of providing an interface between device 600 and the one or more communication media, and may be one or more of a wired network card, a wireless network card, a modem, an infrared transceiver, an acoustic transceiver and/or any other suitable type of network communication module.

In one embodiment, the methods and systems described herein may be implemented via software code that is stored on one or more computer readable media and includes instructions that when executed (e.g., on processor 602) implement parts or all of the techniques described herein.

Device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be appreciated that the techniques described herein are not limited to executing on any particular system or group of systems. For example, embodiments may run on one device or on a combination of devices. Also, it should be appreciated that the techniques described herein are not limited to any particular architecture, network, or communication protocol.

The techniques described herein are not limited in their application to the details of construction and the arrangement of components set forth in the following description or illustrated in the drawings. The techniques described herein are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computer system comprising at least one processor and memory and allocating resources for users of a service, the service providing an interface for a user having an account on the service through which the user can perform first functions related to artifacts associated with the user's own account and second functions related to artifacts associated with accounts of other users, the method comprising:

communicating an invitation from a user of the service to a prospective user to access the service; and with the at least one processor:

presenting a prospective user interface for the prospective user, the prospective user interface simulating the user interface without enabling the prospective user to perform the first functions;

offering, via the prospective user interface, to the prospective user an opportunity to utilize capabilities of the service comprising the first functions and the second functions; and in response to the prospective user accepting the offer, creating in the memory an account infrastructure on the service for the prospective user, wherein the account infrastructure enables the prospective user to maintain artifacts associated with an account on the service, and presenting a modified user interface for the prospective user, the modified user interface enabling the prospective user to perform the first functions and the second functions.

2. The method of claim 1, wherein a prospective user that accepts the offer comprises a full user and a prospective user that does not accept the offer comprises a light user.

3. The method of claim 1, wherein the prospective user interface and the modified prospective user interface enable users to perform at least one function in addition to the first functions and the second functions.

4. The method of claim 1 further comprising, in response to the prospective user not accepting the offer, presenting the prospective user interface for the prospective user, the prospective user interface offering to the prospective user the opportunity to change an account status of the prospective user such that the prospective user can utilize capabilities of the service comprising the first functions and the second functions.

5. The method of claim 1, wherein communicating the invitation from the user of the service to the prospective user to access the service comprises determining whether the prospective user is a registered user of the service.

6. The method of claim 5, further comprising, if the prospective user is not a registered user, enabling registering the prospective user with the service.

7. The method of claim 1, wherein the first functions comprise creating at least one document by a user.

8. The method of claim 7, wherein the first functions further comprise at least one of storing, editing, grouping and sharing the at least one created document.

9. The method of claim 1, wherein the second functions comprise accessing at least one document created and shared by another user.

10. The method of claim 9, wherein the second functions further comprise editing the at least one document created and shared by another user, wherein resulting edits are stored within an account of the other user.

11. The method of claim 1, wherein an invitation from the user of the service to the prospective user to access the service is communicated via electronic mail.

12. A computer-readable storage medium encoded with computer-executable instructions for implementing a service for a plurality of users, the service supporting, for a user having an account on the service, a first type of user interaction and a second type of user interaction, different than the first type of user interaction, the first type of user interaction relating to manipulation of resources associated with accounts of other users and the second type of user interaction relating to manipulation of resources associated with the account of the user, the computer-executable instructions, when executed by at least one processor, perform steps comprising:

rendering a first user interface for a prospective user of the plurality of users invited by a first user of the plurality of users to access an account maintained by the service associated with the first user, the first user interface supporting the first type of user interaction without enabling the prospective user to perform the second type of user interaction;

offering, via the first user interface, to the prospective user a capability to perform the first type of user interaction and the second type of user interaction; and in response to the prospective user accepting the offer, creating an account infrastructure on the service for the prospective user, wherein the account infrastructure enables the prospective user to manipulate resources associated with an account of the prospective user, and rendering a second user interface for the prospective user, the second user interface enabling the prospective user to perform the first type of user interaction and the second type of user interaction.

13. The computer-readable storage medium of claim 12, wherein the first type of user interaction comprises accessing documents in an account of another user.

14. The computer-readable storage medium of claim 12, wherein the second type of user interaction comprises creating documents in an account of a user.

15. A method of operating a server comprising at least one processor and memory and allocating resources for users of a service, the service providing an interface for a user having an account on the service through which the user can perform first functions related to artifacts associated with the user's own account and second functions related to artifacts associated with accounts of other users, the method comprising:

inviting a prospective user to join the service; and with the at least one processor:

creating a first user interface for the prospective user to provide a user input, the first user interface providing a first degree of capabilities of the service;

offering, via the first user interface, to the prospective user an ability to utilize capabilities of the service above the first degree; and in response to the prospective user accepting the offer:

creating in the memory an infrastructure for an account for the prospective user, wherein the account infrastructure utilizes resources of the service; and creating a second user interface, the second user interface providing a degree of capabilities of the service above the first degree.

16. The method of claim 15, wherein the second user interface provides a first user experience to a registered user of the service and the first user interface provides a user experience simulating the first user experience.

17. The method of claim 15, wherein the first functions comprise creating at least one document by a user.

18. The method of claim 15, wherein the second functions comprise accessing at least one document created and shared by another user.

19. The method of claim 15, wherein the first degree of capabilities of the service comprises capabilities to access at least one artifact created and maintained by another user.

20. The method of claim 19, wherein the at least one artifact comprises at least one of a document or a document folder.

\* \* \* \* \*